United States Patent
Asadi et al.

(10) Patent No.: US 10,824,562 B2
(45) Date of Patent: Nov. 3, 2020

(54) RECONFIGURABLE CACHING

(71) Applicants: Hossein Asadi, Tehran (IR); Reza Salkhordehhaghighi, Mashhad (IR); Shahriyar Ebrahimi, Tehran (IR)

(72) Inventors: Hossein Asadi, Tehran (IR); Reza Salkhordehhaghighi, Mashhad (IR); Shahriyar Ebrahimi, Tehran (IR)

(*) Notice: Subject to any disclaimer, the term of this patent is extended or adjusted under 35 U.S.C. 154(b) by 0 days.

(21) Appl. No.: 16/243,298

(22) Filed: Jan. 9, 2019

(65) Prior Publication Data
US 2019/0163627 A1 May 30, 2019

Related U.S. Application Data

(60) Provisional application No. 62/615,028, filed on Jan. 9, 2018.

(51) Int. Cl.
| G06F 12/0804 | (2016.01) |
| G06F 12/0895 | (2016.01) |
| G06F 3/06    | (2006.01) |
| G06F 12/0888 | (2016.01) |
| G06F 12/0866 | (2016.01) |

(52) U.S. Cl.
CPC ............ *G06F 12/0804* (2013.01); *G06F 3/06* (2013.01); *G06F 12/0866* (2013.01); *G06F 12/0888* (2013.01); *G06F 12/0895* (2013.01); *G06F 2212/1016* (2013.01); *G06F 2212/222* (2013.01); *G06F 2212/601* (2013.01)

(58) Field of Classification Search
CPC .................................................. G06F 12/0866
See application file for complete search history.

(56) References Cited

U.S. PATENT DOCUMENTS

| 6,119,151  | A  | 9/2000  | Cantrell et al. |
| 7,117,311  | B1 | 10/2006 | Rankin et al. |
| 9,021,297  | B1 | 4/2015  | Hayes et al. |
| 9,836,407  | B2 | 12/2017 | Shah et al. |
| 10,152,340 | B2 | 12/2018 | Sivathanu et al. |

(Continued)

FOREIGN PATENT DOCUMENTS

CN  106775942  5/2017

OTHER PUBLICATIONS

Sameki et al. "An IO Scheduling Algorithm to Improve Performance of Flash-Based Solid State Disks." In International Conference in Hossein Asadi Sharif University of Technology, vol. 4, pp. 833-762. 2008.

(Continued)

*Primary Examiner* — Edward J Dudek, Jr.
(74) *Attorney, Agent, or Firm* — Bajwa IP Law Firm; Haris Zaheer Bajwa

(57) ABSTRACT

A method for reconfigurable caching is disclosed. The method includes receiving a workload including a plurality of requests, classifying a first request of the plurality of requests in a first class, classifying the workload in a second class based on the first class, assigning a priority to the first request based on the first class and the second class, and storing the first request in a cache memory including a plurality of blocks responsive to the first request satisfying a caching condition, the cache memory satisfying a validation condition, and the priority satisfying a priority condition.

20 Claims, 11 Drawing Sheets

(56) References Cited

U.S. PATENT DOCUMENTS

| | | | | |
|---|---|---|---|---|
| 2009/0172315 A1* | 7/2009 | Iyer | ............... | G06F 9/5016 |
| | | | | 711/158 |
| 2011/0119228 A1* | 5/2011 | Menze | ............... | G06F 12/0888 |
| | | | | 707/607 |
| 2015/0324294 A1* | 11/2015 | Ogawa | ............... | G06F 12/0871 |
| | | | | 711/118 |
| 2016/0011819 A1* | 1/2016 | Guo | ............... | G06F 3/061 |
| | | | | 711/103 |
| 2016/0283116 A1* | 9/2016 | Ramalingam | ....... | G06F 12/0895 |
| 2018/0024936 A1* | 1/2018 | McKean | ............. | G06F 11/3457 |
| | | | | 711/114 |
| 2019/0065404 A1* | 2/2019 | Kabra | ............... | G06F 12/0871 |

OTHER PUBLICATIONS

Blankstein et al. "Hyperbolic caching: Flexible caching for web applications." In 2017 USENIX Annual Technical Conference (USENIX ATC 17), pp. 499-511. 2017.

Shin et al. "FTL design exploration in reconfigurable high-performance SSD for server applications." In Proceedings of the 23rd international conference on Supercomputing, pp. 338-349. ACM, 2009.

Boukhobza et al. "A scalable and highly configurable cache-aware hybrid flash translation layer." Computers 3, No. 1 (2014): 36-57.

Panda et al. "A survey on replacement strategies in cache memory for embedded systems." In Distributed Computing, VLSI, Electrical Circuits and Robotics (DISCOVER), IEEE, pp. 12-17. IEEE, 2016.

Olanrewaju et al., Dec. 2016. A study on performance evaluation of conventional cache replacement algorithms: A review. In Parallel, Distributed and Grid Computing (PDGC), 2016 Fourth International Conference on (pp. 550-556). IEEE.

* cited by examiner

RECONFIGURABLE CACHING

CROSS-REFERENCE TO RELATED APPLICATION

This application claims the benefit of priority from pending U.S. Provisional Patent Application Ser. No. 62/615,028, filed on Jan. 9, 2018, and entitled "RECONFIGURABLE ONLINE SSD CACHING BASED ON WORKLOAD CHARACTERIZATION," which is incorporated herein by reference in its entirety.

TECHNICAL FIELD

The present disclosure generally relates to storage systems, and particularly, to caching.

BACKGROUND

Hard disk drives (HDDs) have a relatively low performance compared to other parts of computer systems. Storage systems mostly employ HDDs as storage devices. Therefore, they lack the desired performance of applications. To reduce the performance gap of storage systems and other parts of computer systems, solid state drives (SSDs) may be used in storage systems. Due to the high cost of SSDs, storage systems with all-SSD disks are too costly to be used in most scenarios. Therefore, storage systems tend to use SSDs as a caching layer for HDD arrays. A caching layer is relatively smaller than the main array and requires algorithms for deciding which data pages are eligible to be placed in cache. The performance of caching layer may depend on the success of a caching algorithm in identifying performance-critical data pages. In addition to performance of a caching layer, lifetime of SSDs may also need to be considered. SSDs can respond to limited number of write requests before they wear out. Once SSDs wear out, their performance drops significantly and the probability of read/write failure increases. Accordingly, both performance and reliability of storage systems may depend on the lifetime of SSDs. Therefore, an SSD caching layer may try to send as few write requests as possible to SSDs while providing a desired performance.

To this end, there are several industry and academic researches on improving performance and/or lifetime of SSD-based caching layers for storage systems. However, such studies consider a fixed workload and try to optimize their algorithms based on the characteristics of the running workload. If the running workload changes during the runtime or several applications are running simultaneously (which is a common case in storage systems), such studies fail to improve performance since they are not optimized towards all types of workloads. There is, therefore, a need for a reconfigurable caching method that modifies the caching strategy based on changes in workload characteristics.

SUMMARY

This summary is intended to provide an overview of the subject matter of the present disclosure, and is not intended to identify essential elements or key elements of the subject matter, nor is it intended to be used to determine the scope of the claimed implementations. The proper scope of the present disclosure may be ascertained from the claims set forth below in view of the detailed description below and the drawings.

In one general aspect, the present disclosure describes an exemplary method for reconfigurable caching. An exemplary method may include receiving a workload including a plurality of requests, classifying a first request of the plurality of requests in a first class, classifying the workload in a second class based on the first class, assigning a priority to the first request based on the first class and the second class, and storing the first request in a cache memory including a plurality of blocks responsive to the first request satisfying a caching condition, the cache memory satisfying a validation condition, and the priority satisfying a priority condition. In an exemplary embodiment, the first request may be associated with a first plurality of addresses, and each of the first plurality of addresses may be an integer number.

In an exemplary embodiment, receiving the workload may include receiving a data block from a file system of a computer system. In an exemplary embodiment, classifying the first request may include classifying the first request in a random class, arranging the plurality of requests in a request queue, selecting the first request from the request queue, selecting a second request of the plurality of requests associated with a second plurality of addresses from the request queue, classifying the first request in a strided class responsive to a smallest address of the first plurality of addresses being larger than a largest address of the second plurality of addresses by a gap value, classifying the first request in a sequential class responsive to the smallest address of the first plurality of addresses being larger than the largest address of the second plurality of addresses by 1, and classifying the first request in an overlapped class responsive to a first portion of the first plurality of addresses being the same as a second portion of the second plurality of addresses. The gap value may be smaller than a gap threshold, and each of the second plurality of addresses may be an integer number. In an exemplary embodiment, arranging the plurality of requests in the request queue may include arranging the plurality of requests in a queue with a size of 65 requests.

In an exemplary embodiment, classifying the workload in the second class may include classifying the workload in a random consumer class responsive to more than 60 percent of the plurality of requests read from a memory unit and more than 70 percent of the plurality of requests classified in the random class, classifying the workload in a sequential producer-consumer class responsive to 40 percent to 60 percent of the plurality of requests read from the memory unit and more than 50 percent of the plurality of requests classified in the sequential class, classifying the workload in a random producer-consumer class responsive to 40 percent to 80 percent of the plurality of requests read from the memory unit and more than 50 percent of the plurality of requests classified in the random class, classifying the workload in an archival consumer class responsive to more than 80 percent of the plurality of requests read from the memory unit and more than 70 percent of the plurality of requests classified in the sequential class, and classifying the workload in a large file generator class responsive to more than 90 percent of the plurality of requests written on the memory unit and more than 60 percent of the plurality of requests classified in the sequential class.

In an exemplary embodiment, the caching condition may include the first request not stored in the cache memory, and the validation condition may include all of the plurality of blocks being valid. In an exemplary embodiment, the priority condition may include one of at least one of the plurality of blocks being empty, and the priority of the first request being larger than a smallest block priority of a plurality of block priorities. Each of the plurality of block priorities may be assigned to a block of the plurality of blocks.

In an exemplary embodiment, storing the first request in the cache memory may include storing the first request in an empty block responsive to at least one of the plurality of blocks being empty, and storing the first request in a minimal-priority block responsive to the priority of the first request being larger than the smallest block priority. The minimal-priority block may be associated with the smallest block priority. An exemplary method may further include storing data of the minimal-priority block in a memory unit prior to storing the first request in the minimal-priority block.

Other exemplary systems, methods, features and advantages of the implementations will be, or will become, apparent to one of ordinary skill in the art upon examination of the following figures and detailed description. It is intended that all such additional systems, methods, features and advantages be included within this description and this summary, be within the scope of the implementations, and be protected by the claims herein.

BRIEF DESCRIPTION OF THE DRAWINGS

The drawing figures depict one or more implementations in accord with the present teachings, by way of example only, not by way of limitation. In the figures, like reference numerals refer to the same or similar elements.

DETAILED DESCRIPTION

In the following detailed description, numerous specific details are set forth by way of examples in order to provide a thorough understanding of the relevant teachings. However, it should be apparent that the present teachings may be practiced without such details. In other instances, well known methods, procedures, components, and/or circuitry have been described at a relatively high-level, without detail, in order to avoid unnecessarily obscuring aspects of the present teachings.

The following detailed description is presented to enable a person skilled in the art to make and use the methods and devices disclosed in exemplary embodiments of the present disclosure. For purposes of explanation, specific nomenclature is set forth to provide a thorough understanding of the present disclosure. However, it will be apparent to one skilled in the art that these specific details are not required to practice the disclosed exemplary embodiments. Descriptions of specific exemplary embodiments are provided only as representative examples. Various modifications to the exemplary implementations will be readily apparent to one skilled in the art, and the general principles defined herein may be applied to other implementations and applications without departing from the scope of the present disclosure. The present disclosure is not intended to be limited to the implementations shown, but is to be accorded the widest possible scope consistent with the principles and features disclosed herein.

Herein is disclosed an exemplary method and architecture for reconfigurable caching of a workload that is received from a file system. An exemplary method may monitor changes in a sequence of requests in the workload, and based on the type of each of the requests, may categorize the workload in a predefined class. Based on the workload category, an exemplary method may decide on storing received requests in a cache memory by assigning a priority for each of the received requests, and comparing the priority with those of previous requests that are already stored in the cache.

Figure 1A:
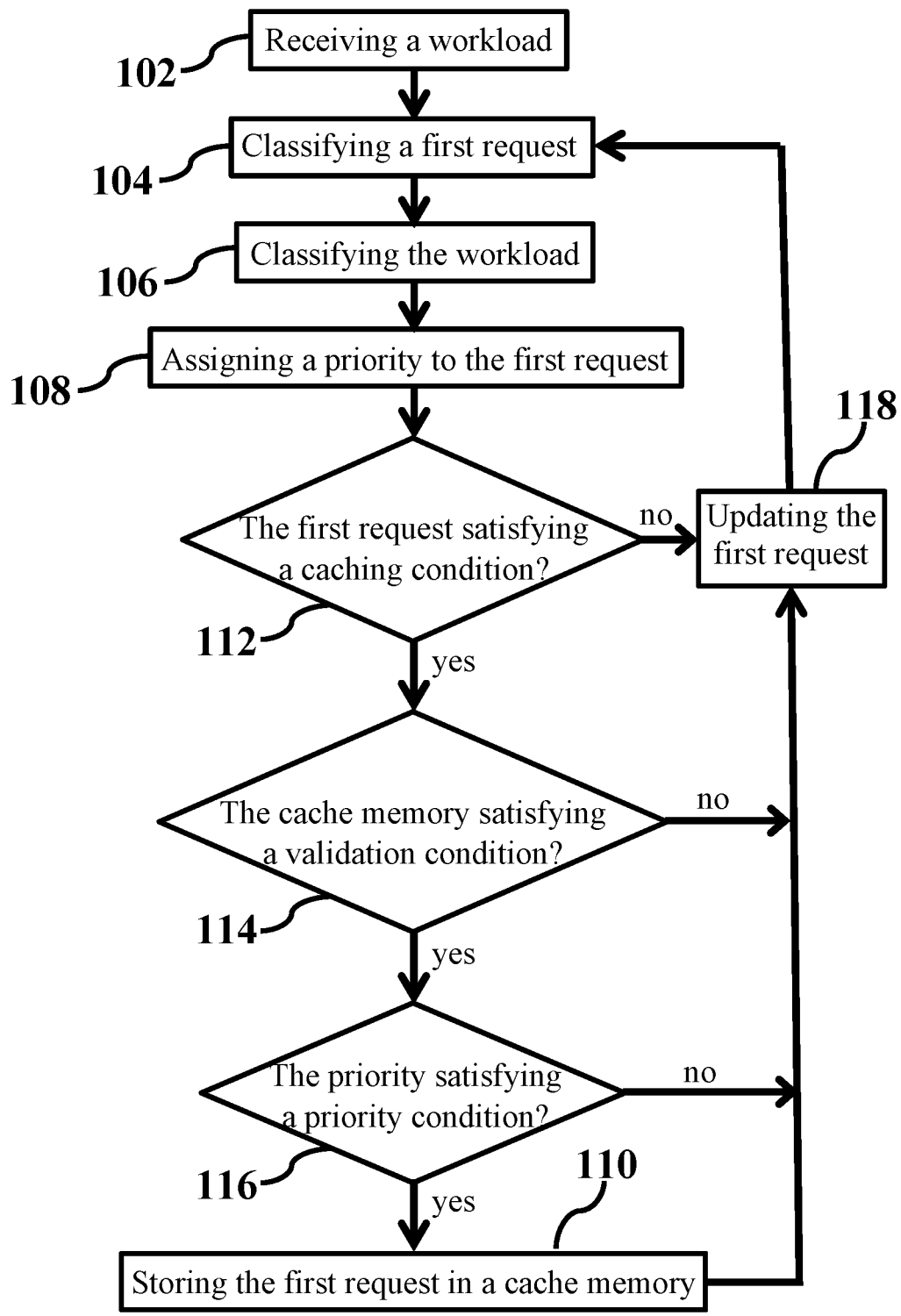
FIG. 1A shows a flowchart of a method for reconfigurable caching, consistent with one or more exemplary embodiments of the present disclosure.

FIG. 1A shows a flowchart of an exemplary method for reconfigurable caching, consistent with one or more exemplary embodiments of the present disclosure. FIG. 2 shows a schematic of an exemplary reconfigurable caching architecture, consistent with one or more exemplary embodiments of the present disclosure. Referring to FIGS. 1 and 2, in an exemplary embodiment, an exemplary method 100 may include receiving a workload including a plurality of requests by a mapping unit 202 from a file system 204 (step 102), classifying a first request of the plurality of requests in a first class by an analyzing unit 206 (step 104), classifying the workload in a second class based on the first class by a reconfiguration unit 208 (step 106), assigning a priority to the first request based on the first class and the second class by a priority calculation unit 210 (step 108), and storing the first request in a cache memory 212 including a plurality of blocks by a cache managing unit 214 (step 110) responsive to the first request satisfying a caching condition (step 112, yes), the cache memory 212 satisfying a validation condition (step 114, yes), and the priority satisfying a priority condition (step 116, yes). In an exemplary embodiment, the first request may be associated with a first plurality of addresses, and each of the first plurality of addresses may be an integer number. In an exemplary embodiment, if any of the conditions of steps 112, 114, and 116 are not satisfied, the first request may not be stored in cache memory 212. In this case, and also after storing the first request in cache memory 212 (step 110), in an exemplary embodiment, method 100 may proceed to updating the first request (step 118) by receiving a new request from the workload and replacing the first request by the new request. In an exemplary embodiment, method 100 may then repeat step 104 (classifying the first request) and the proceeding steps.

In further details with respect to step 102, receiving the workload may include receiving a data block from file system 204. In an exemplary embodiment, file system 204 may be associated with a computer system. In an exemplary embodiment, mapping unit 202 may be further configured to send the first request to a hard disk drive (HDD) 216 responsive to the first request being tagged uncacheable and configured to invalidate a block of the plurality of blocks responsive to the first request being tagged uncacheable and the first request being stored in the block. In other words, if any uncacheable request is stored in a block of cache memory 214, that block may be invalidated.

Figure 3:
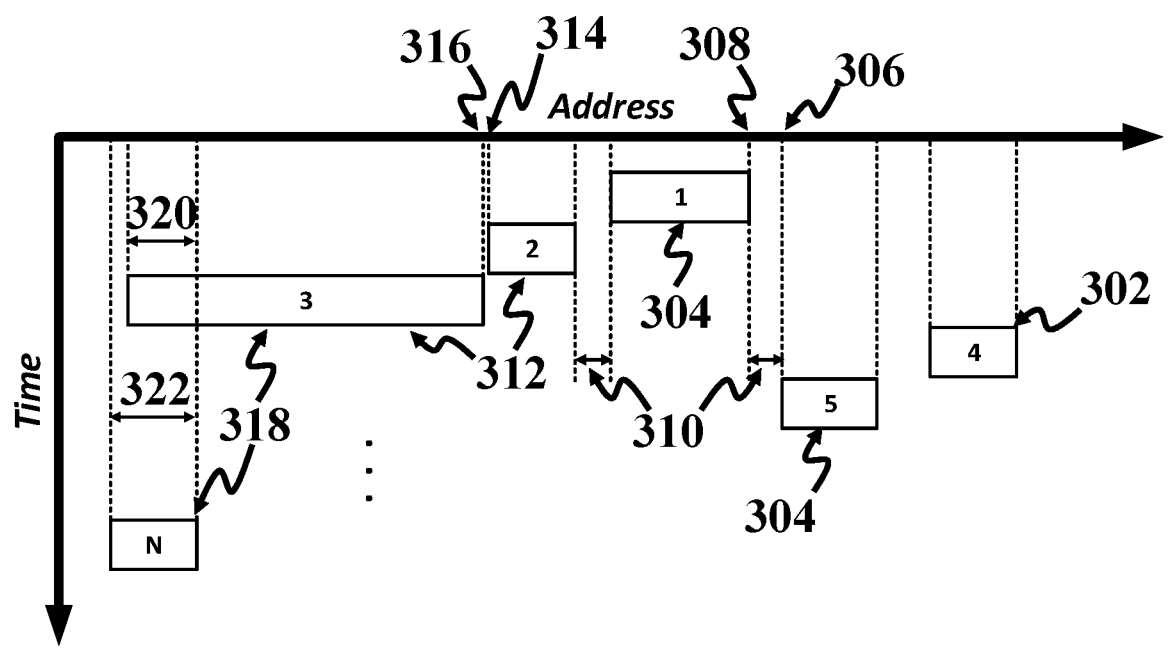
FIG. 3 shows a schematic of a sequence of the plurality of requests, consistent with one or more exemplary embodiments of the present disclosure.

In further details with respect to step 104, the first request may be classified in one of four classes, including a random class, a strided class, a sequential class, and an overlapped class. FIG. 3 shows a schematic of an exemplary sequence of the plurality of requests, consistent with one or more exemplary embodiments of the present disclosure. In an exemplary embodiment, each of the plurality of requests may be classified based on neighboring requests, i.e., limited number of requests received over time. In an exemplary embodiment, the sequential class may include requests that start immediately after a neighboring request, or end immediately before a neighboring request. For example, request number 2 may be included in the sequential class, since its starting point is exactly after the ending point of request number 3. A request in the sequential class may also be referred to as a sequential request. In an exemplary embodiment, the strided class may include requests that start after a small gap from the ending point of a neighboring request, for example, request number 1 that starts after a small gap after request number 2, and request number 5 that starts after a small gap after request number 1. A request in the strided class may also be referred to as a strided request. In an exemplary embodiment, the overlapped class may include requests that share a data page with a neighboring request. For example, request number N may be included in the overlapped class since it shares a data page with request number 3. A request in the overlapped class may also be referred to as an overlapped request. In an exemplary embodiment, the random class may include requests that are not included in any of the sequential class, the strided class, and the overlapped class. A request in the random class may also be referred to as a random request.

Figure 1B:
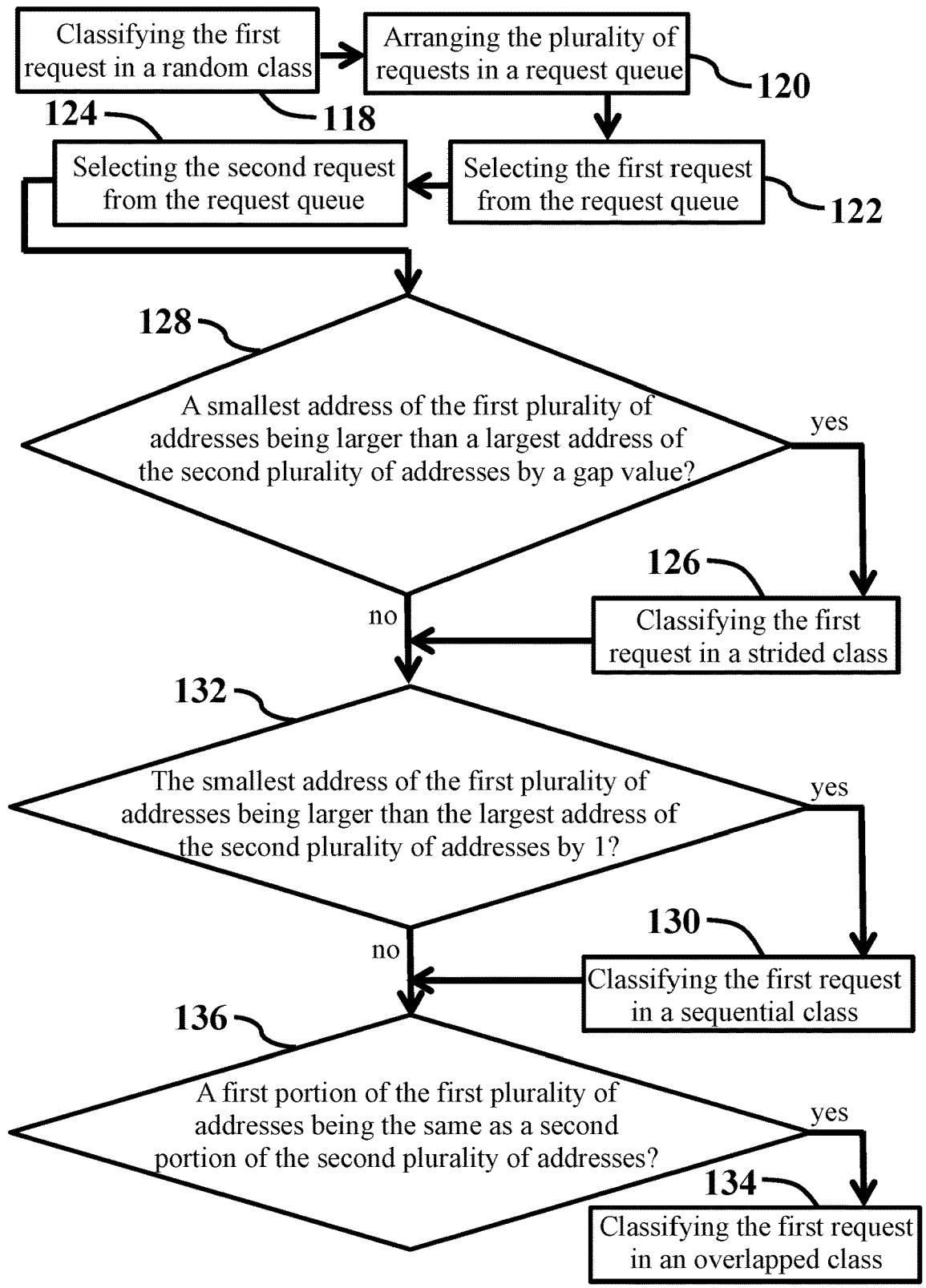
FIG. 1B shows a flowchart of an embodiment of classifying a request, consistent with one or more exemplary embodiments of the present disclosure.
Figure 2:
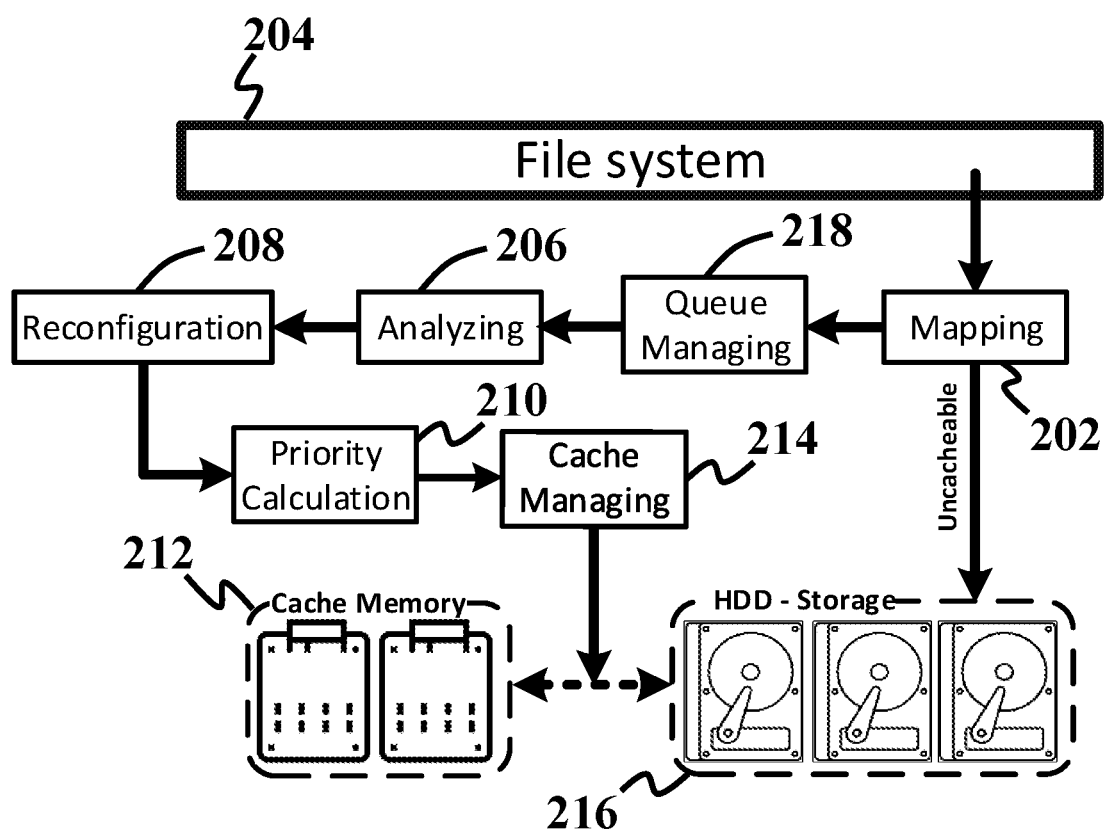
FIG. 2 shows a schematic of a reconfigurable caching architecture, consistent with one or more exemplary embodiments of the present disclosure.

FIG. 1B shows a flowchart of an exemplary embodiment of classifying the first request (step 104), consistent with one or more exemplary embodiments of the present disclosure. Referring to FIGS. 1A-3, in an exemplary embodiment, classifying the first request (step 104) may include classifying the first request in a random class 302 (step 118), arranging the plurality of requests in a request queue by a queue managing unit 218 (step 120), selecting the first request from the request queue (step 122), selecting a second request of the plurality of requests associated with a second plurality of addresses from the request queue (step 124), classifying the first request in a strided class 304 (step 126) responsive to a smallest address of the first plurality of addresses (for example, an address point 306 in FIG. 3) being larger than a largest address of the second plurality of addresses (for example, an address point 308 in FIG. 3) by a gap value 310 (step 128, yes), classifying the first request in a sequential class 312 (step 130) responsive to the smallest address of the first plurality of addresses (for example, an address point 314 in FIG. 3) being larger than the largest address of the second plurality of addresses (for example, an address point 316 in FIG. 3) by 1 (step 132, yes), and classifying the first request in an overlapped class 318 (step 134) responsive to a first portion 320 of the first plurality of addresses being the same as a second portion 322 of the second plurality of addresses (step 136, yes).

In an exemplary embodiment, gap value 310 may be smaller than a gap threshold and may be constant for all of the plurality of requests in the request queue. In an exemplary embodiment, each of the second plurality of addresses may be an integer number. In an exemplary embodiment, the size of the request queue, i.e., the number of the requests N in the request queue, may be about 65 requests. Therefore, any request may be compared with at most 64 requests for classification.

As shown in FIG. 3, in an exemplary embodiment, a request may be classified in more than one class. For example, request number 3 may be classified in both sequential class 312 and overlapped class 318. Therefore, in an exemplary embodiment, the request classes may be prioritized in a particular order. For example, the classes may be sorted to overlapped, sequential, strided, and random, based on their priority. Hence, request number 3 may be assigned to overlapped class 318, due to the highest priority of overlapped class 318.

In further details with respect to step 106, the workload may be classified in one of five classes, including a random consumer class, a sequential producer-consumer class, a random producer-consumer class, an archival consumer class, and a large file generator class. In an exemplary embodiment, workload classification may be based on the classification of the plurality of requests in the workload, and a status of each of the plurality of requests with respect to being read from a memory unit (i.e., a read request) or being written on a memory unit (i.e., a write request). Table 1 summarizes specifications of each of the five classes of the workload.

TABLE 1

Approximate percentage of request types in each of the workload classes.

| | Read | Random | Strided | Sequential | Overlapped |
|---|---|---|---|---|---|
| Random consumer | More than 60 | More than 70 | Less than 15 | More than 10 | More than 10 |
| Sequential producer/consumer | 40 to 60 | Less than 30 | Less than 20 | More than 50 | Less than 50 |
| Random producer/consumer | 40 to 80 | More than 60 | Less than 30 | Less than 30 | Less than 10 |
| Archival consumer | More than 80 | Less than 20 | Less than 40 | More than 70 | 20 to 90 |
| Large file generator | Less than 10 | More than 40 | Less than 20 | More than 60 | Less than 10 |

In an exemplary embodiment, the random consumer class may include read-dominant workloads that access an underlying storage device with random requests such as database management systems. In an exemplary embodiment, the sequential producer-consumer class may include workloads that include both read and write requests and have sequential accesses to a server. Such requests may be associated with documents that have a medium file size. When an underlying system is based on a filesystem, upon editing a file, the whole file contents may be uploaded to the server. This may result in sequential read or write requests to the server. This scenario may occur in a sharing system that works based on network filesystems in which users can access their files and share them with the others.

In an exemplary embodiment, the random producer-consumer class may include workloads in which the majority of requests are random (similar to the random consumer class), and include a considerable number of write requests. Such requests may be issued by mail servers and on-line transaction processing (OLTP) servers.

In an exemplary embodiment, the archival consumer class may include workloads that include a large number of sequential requests that are issued for read accesses. Such requests may be issued by file transfer protocol (FTP) and media servers that have large number of concurrent users that access files for read purposes. The size of files associated to the archival consumer class may be quite large.

In an exemplary embodiment, the large file generator class may include workloads with mostly write requests that belong to the sequential class. In an exemplary embodiment, a considerable number of random requests may also exist in such workloads due to interleaving of requests from various processes. Such requests may be issued by surveillance systems that store videos, and by monitoring systems that include a few processes for writing large files on disks.

In further details with respect to step 106, the second class may include a random consumer class responsive to more than about 60 percent of the plurality of requests of the workload read from a memory unit (for example, HDD 216) and more than about 70 percent of the plurality of requests of the workload classified in random class 302. In an exemplary embodiment, less than about 15 percent of the plurality of requests of the workload in the random consumer class may be classified in strided class 304, more than about 10 percent of the plurality of requests of the workload in the random consumer class may be classified in sequential class 312, and more than about 10 percent of the plurality of requests of the workload in the random consumer class may be classified in overlapped class 318.

In an exemplary embodiment, the second class may include a sequential producer-consumer class responsive to about 40 percent to about 60 percent of the plurality of requests of the workload read from the memory unit and more than about 50 percent of the plurality of requests of the workload classified in sequential class 312. In an exemplary embodiment, less than about 30 percent of the plurality of requests of the workload in the sequential producer-consumer class may be classified in random class 302, less than about 20 percent of the plurality of requests of the workload in the sequential producer-consumer class may be classified in strided class 304, and less than about 50 percent of the plurality of requests of the workload in the sequential producer-consumer class may be classified in overlapped class 318.

In an exemplary embodiment, the second class may include a random producer-consumer class responsive to about 40 percent to about 80 percent of the plurality of requests of the workload read from the memory unit and more than about 60 percent of the plurality of requests of the workload classified in random class 302. In an exemplary embodiment, less than about 30 percent of the plurality of requests of the workload in the random producer-consumer class may be classified in strided class 304, less than about 30 percent of the plurality of requests of the workload in the random producer-consumer class may be classified in sequential class 312, and less than about 10 percent of the plurality of requests of the workload in the random producer-consumer class may be classified in overlapped class 318.

In an exemplary embodiment, the second class may include an archival consumer class responsive to more than about 80 percent of the plurality of requests of the workload read from the memory unit and more than about 70 percent of the plurality of requests of the workload classified in sequential class 312. In an exemplary embodiment, less than about 20 percent of the plurality of requests of the workload in the archival consumer class may be classified in random class 302, less than about 40 percent of the plurality of requests of the workload in the archival consumer class may be classified in strided class 304, and about 20 percent to about 90 percent of the plurality of requests of the workload in the archival consumer class may be classified in overlapped class 318.

In an exemplary embodiment, the second class may include a large file generator class responsive to more than about 90 percent of the plurality of requests of the workload written on the memory unit and more than about 60 percent of the plurality of requests of the workload classified in sequential class 312. In an exemplary embodiment, more than about 40 percent of the plurality of requests of the workload in the large file generator class may be classified in random class 302, less than about 20 percent of the plurality of requests of the workload in the large file generator class may be classified in strided class 304, and less than about 10 percent of the plurality of requests of the workload in the large file generator class may be classified in overlapped class 318.

In an exemplary embodiment, priority calculation unit 210 may calculate the priority of the first request (in step 108) utilizing a predefined look-up table. The look-up table may include priorities of different combinations of first class and the second class, by which the priority of the first request may be extracted. In an exemplary embodiment, the priority may correspond to a unique combination of the first class (including one of random class 302, strided class 304, sequential class 312, and overlapped class 318), the second class (including one of the random consumer class, the sequential producer-consumer, the random producer-consumer class, the archival consumer class, and the large file generator class), and a request type associated with the first request. The request type may include a read request and a write request.

In an exemplary embodiment, the caching condition in step 112 may include the first request not stored in cache memory 212. In an exemplary embodiment, the validation condition in step 114 may include all of the plurality of blocks of cache memory 212 being valid. In an exemplary embodiment, the priority condition may include one of the following conditions: first, at least one of the plurality of blocks of cache memory 212 being empty, and second, the priority of the first request being larger than a smallest block priority of a plurality of block priorities. Each of the plurality of block priorities may be assigned to a block of the plurality of blocks, according to a priority of a request that is previously stored in that block.

In an exemplary embodiment, storing the first request in cache memory 212 by cache managing unit 214 (step 110) may include storing the first request in an empty block responsive to at least one of the plurality of blocks being empty, and storing the first request in a minimal-priority block responsive to the priority of the first request being larger than the smallest block priority. The minimal-priority block may be associated with the smallest block priority. In an exemplary embodiment, cache managing unit 214 may be further configured for storing data of the minimal-priority block in a memory unit (for example, HDD 216), also referred to as eviction, prior to storing the first request in cache memory 212. In an exemplary embodiment, cache memory 212 may include a solid-state drive (SSD).

Figure 4:
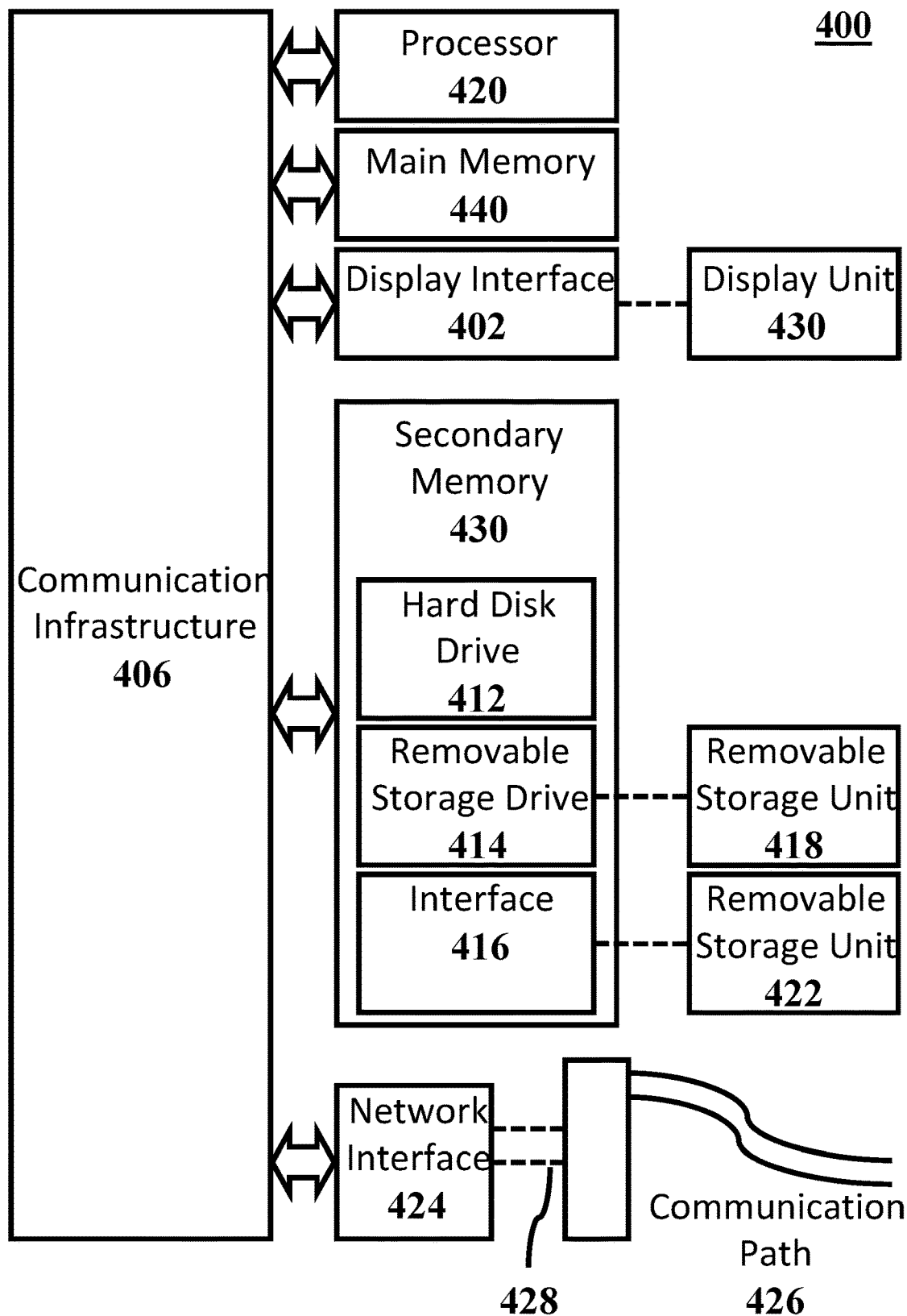
FIG. 4 shows a high-level functional block diagram of a computer system, consistent with one or more exemplary embodiments of the present disclosure.

FIG. 4 illustrates a high-level functional block diagram of an exemplary computer system 400, in which embodiments of the present disclosure, or portions thereof, may be implemented, e.g., as computer-readable code. For example, each of the exemplary units and steps described above with respect to FIGS. 1A-2 can be implemented in computer system 400 using hardware, software, firmware, tangible computer readable media having instructions stored thereon, or a combination thereof and may be implemented in one or more computer systems or other processing systems. Hardware, software, or any combination of such may embody any of the modules and components in FIGS. 1A-2, as described above.

If programmable logic is used, such logic may be executed on a commercially available processing platform or a special purpose device. One of ordinary skill in the art may appreciate that embodiments of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device.

For instance, at least one processor device and a memory may be used to implement the above-described embodiments. A processor device may be a single processor, a plurality of processors, or combinations thereof. Processor devices may have one or more processor "cores."

Various embodiments of the present disclosure, as described above in the examples of FIGS. 1A-2, may be implemented using computer system 400. After reading this description, it will become apparent to a person skilled in the relevant art how to implement embodiments of the present disclosure using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

As shown in FIG. 4, computer system 400 may include a central processing unit (CPU) 420. CPU 420 may be any type of processor device including, for example, any type of special purpose or a general-purpose microprocessor device. As will be appreciated by persons skilled in the relevant art, CPU 420 also may be a single processor in a multi-core/multiprocessor system, such system operating alone, or in a cluster of computing devices operating in a cluster or server farm. CPU 420 may be connected to a data communication infrastructure 406, for example, a bus, message queue, network, or multi-core message-passing scheme.

In an exemplary embodiment, computer system 400 may include a display interface 402, for example a video connector, to transfer data to a display unit 430, for example, a monitor. Computer system 400 also may include a main memory 440, for example, random access memory (RAM), and also may include a secondary memory 430. Secondary memory 430, e.g., a read-only memory (ROM), may be, for example, a hard disk drive 412 or a removable storage drive 414. Such a removable storage drive may comprise, for example, a floppy disk drive, a magnetic tape drive, an optical disk drive, a flash memory, or the like. The removable storage drive in this example reads from and/or writes to a removable storage unit 418 in a well-known manner. The removable storage unit may comprise a floppy disk, magnetic tape, optical disk, etc. which is read by and written to by the removable storage drive. As will be appreciated by persons skilled in the relevant art, such a removable storage unit generally includes a computer usable storage medium having stored therein computer software and/or data.

In alternative implementations, secondary memory 430 may include other similar means for allowing computer programs or other instructions to be loaded into computer system 400. Examples of such means may include a program cartridge and cartridge interface 416 (such as that found in video game devices), a removable memory chip (such as an EPROM, or PROM) and associated socket, and other removable storage units and interfaces, which allow software and data to be transferred from a removable storage unit 422 to computer system 400.

Computer system 400 also may include a communications interface ("COM"). The communications interface allows software and data to be transferred between computer system 400 and external devices. The communications interface may include a modem, a network interface 424 (such as an Ethernet card), a communications port 428, a PCMCIA slot and card, or the like. Software and data transferred via the communications interface may be in the form of signals, which may be electronic, electromagnetic, optical, or other signals capable of being received by the communications interface. These signals may be provided to the communications interface via a communications path 426 of computer system 400, which may be implemented using, for example, wire or cable, fiber optics, a phone line, a cellular phone link, an RF link or other communications channels.

The hardware elements, operating systems, and programming languages of such equipment are conventional in nature, and it is presumed that those skilled in the art are adequately familiar therewith. Computer system 400 may also include input and output ports to connect with input and output devices such as keyboards, mice, touchscreens, monitors, displays, etc. Of course, the various server functions may be implemented in a distributed fashion on a number of similar platforms, to distribute the processing load. Alternatively, the servers may be implemented by appropriate programming of one computer hardware platform.

Program aspects of the technology may be thought of as "products" or "articles of manufacture" typically in the form of executable code and/or associated data that is carried on or embodied in a type of machine-readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer of the mobile communication network into the computer platform of a server and/or from a server to the mobile device. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links, or the like, also may be considered as media bearing the software. As used herein, unless restricted to non-transitory, tangible "storage" media, terms such as computer or machine "readable medium" refer to any medium that participates in providing instructions to a processor for execution.

EXAMPLE

In this example, an exemplary implementation of reconfigurable caching is demonstrated. Over 75 traces have been analyzed and based on this analysis, five classes for workloads have been proposed which are a) random consumer, b) sequential producer-consumer, c) random producer-consumer, d) archival consumer, and e) large file generator. In the remainder of this section, these categories are detailed.

Figure 5A:
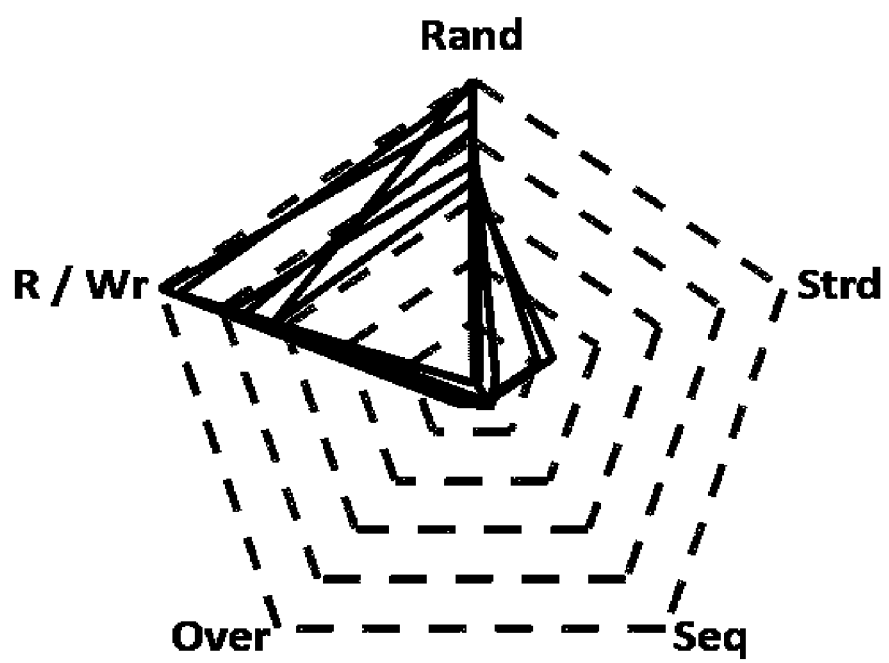
FIG. 5A shows characterization of majority of analyzed workloads categorized as random consumers, consistent with one or more exemplary embodiments of the present disclosure.

FIG. 5A shows the characterization of workloads categorized as random consumers, consistent with one or more exemplary embodiments of the present disclosure. Random consumers may be considered read-dominant workloads that access the underlying storage device with random requests such as database management systems. These workloads exhibit very low performance in HDD-based disk subsystems. In addition, the write-back cache of HDDs which is able to cache random write requests and send them to the rotational magnetic part of the disk at a later time, is unable to perform well for random consumers since most requests are read. The cache configuration for this category may have a small cache line size (same as application block size, for example, 4-8 KB) since almost all requests are random with a small size and, hence, using large cache line size may result in occupying the cache with undesirable data. In addition, the access frequency may be a suitable metric for identifying performance-critical data pages since all request may have a same size and request type. Similarity of the requests means that there may be no need for filtering a specified request type in order to cache or directly send them to the disk.

Figure 5B:
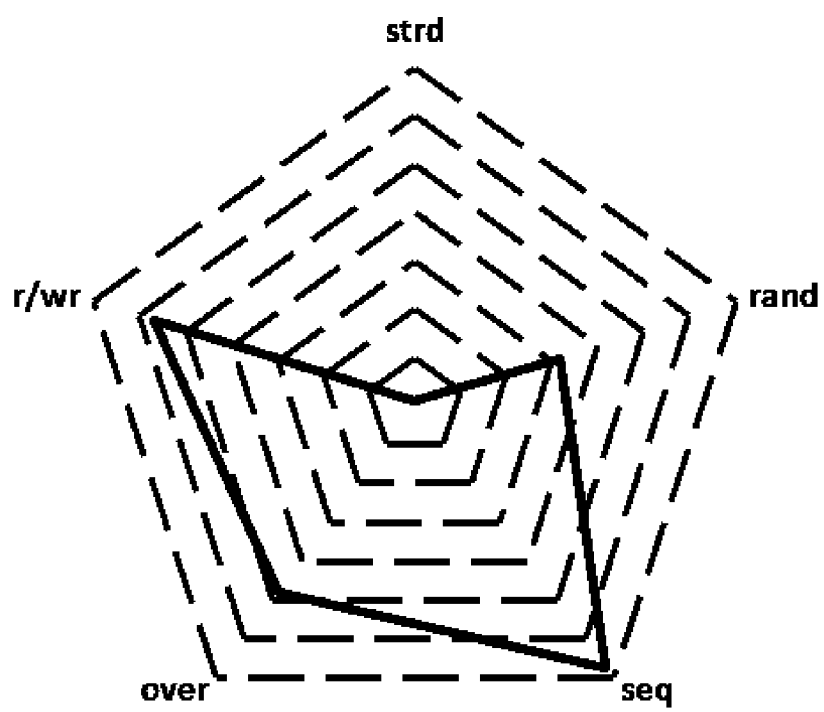
FIG. 5B shows characterization of workloads categorized as sequential producer-consumers, consistent with one or more exemplary embodiments of the present disclosure.

FIG. 5B shows the characterization of workloads categorized as sequential producer-consumers, consistent with one or more exemplary embodiments of the present disclosure. Most organizations have a sharing system based on network file systems that users can access their files and share them with the others. File types in this scenario are mostly documents that have a medium file size. Since the underlying system is based on a file system, upon editing a file, the whole file contents may be uploaded to the server. This may result in sequential accesses to the server which contains both read and write requests. An optimal cache configuration for this category may consider the recency of accesses since users may tend to access the newly created files more than old files. The cache line size may preferably be set to larger values (128 KB) since requests are mostly sequential. The degree of file sharing may determine the number of overlapped requests in these workloads. The interleaving of sequential requests from accessing various files may result in a semi-random access pattern observed at the disk level since different files may reside on different parts of the disk. Therefore, identifying an input/output (I/O) stream for each file and either caching all requests or ignoring them may result in sending more sequential requests to the disk and improve its performance.

Figure 5C:
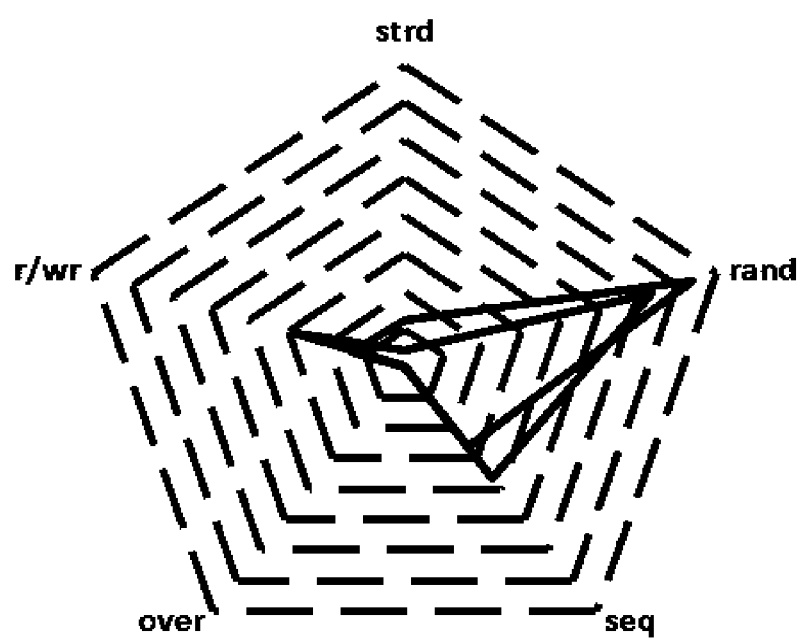
FIG. 5C shows characterization of workloads categorized as random producer-consumers, consistent with one or more exemplary embodiments of the present disclosure.

FIG. 5C shows the characterization of workloads categorized as random producer-consumers, consistent with one or more exemplary embodiments of the present disclosure. Although most requests in this category may be random (similar to the random consumers class), issuing many write requests by applications associated with this category may result in vast difference between two categories. The performance gain on random read requests may be almost twofold of random write requests, which motivates preferring random read requests over random write requests for caching. Most mail servers and a few of on-line transaction processing (OLTP) servers may belong to this category. Therefore, in addition to the access frequency which may be beneficial in identifying performance-critical random requests, using recency may be also helpful since for example, users may access their new e-mails more often. The cache configuration for this class may include a small cache line size, a priority based eviction policy which assigns higher priority to read requests, and accumulates the priority based on access frequency. This may enable capturing recency, frequency, and reading priority simultaneously.

Figure 5D:
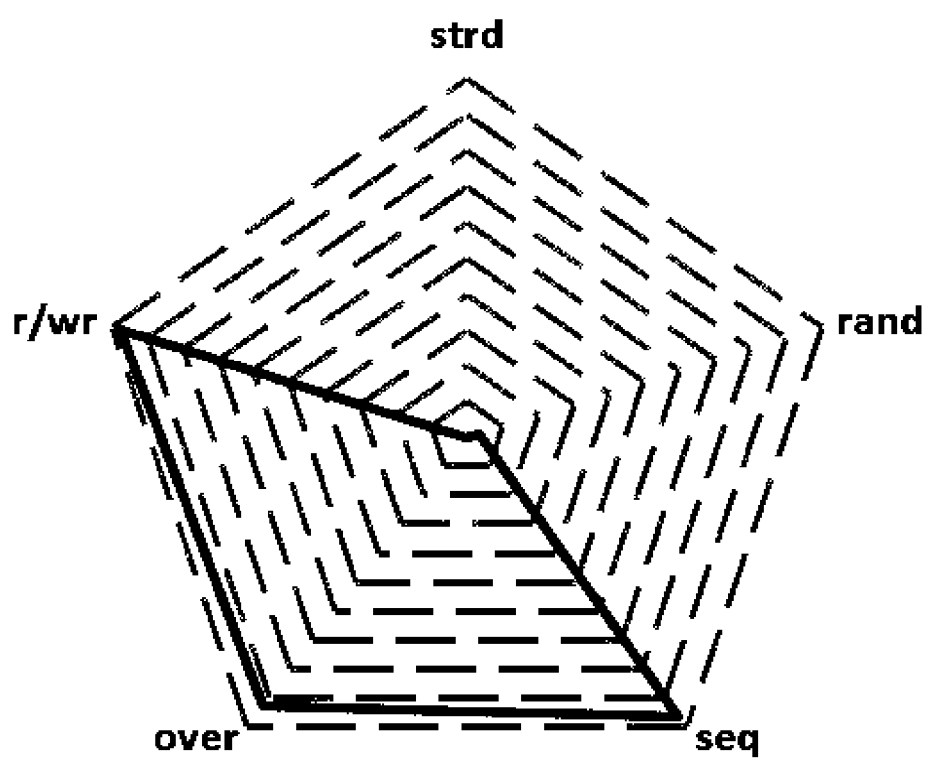
FIG. 5D shows characterization of workloads categorized as archival consumers, consistent with one or more exemplary embodiments of the present disclosure.

FIG. 5D shows the characterization of workloads categorized as archival consumers, consistent with one or more exemplary embodiments of the present disclosure. File transfer protocol (FTP) and media servers may have large number of concurrent users that access files for read purpose. The size of the files in this category may be quite large and almost all requests may be sequential. Since many concurrent users may access the same set of files, the percentage of the overlapped requests may be higher in this class compared to the sequential producer-consumer class. The concurrent users that access the same file may read different parts of the file at the same time which results in numerous strided requests. The cache line size for this class may be set to a large value (128 KB) in order to reduce the overhead of moving data pages to/from the cache memory. Detecting sequential request streams may result in either caching or bypassing the cache for all requests of a stream. This technique may reduce the randomness of the requests in both SSD and HDD which may improve performance.

Figure 5E:
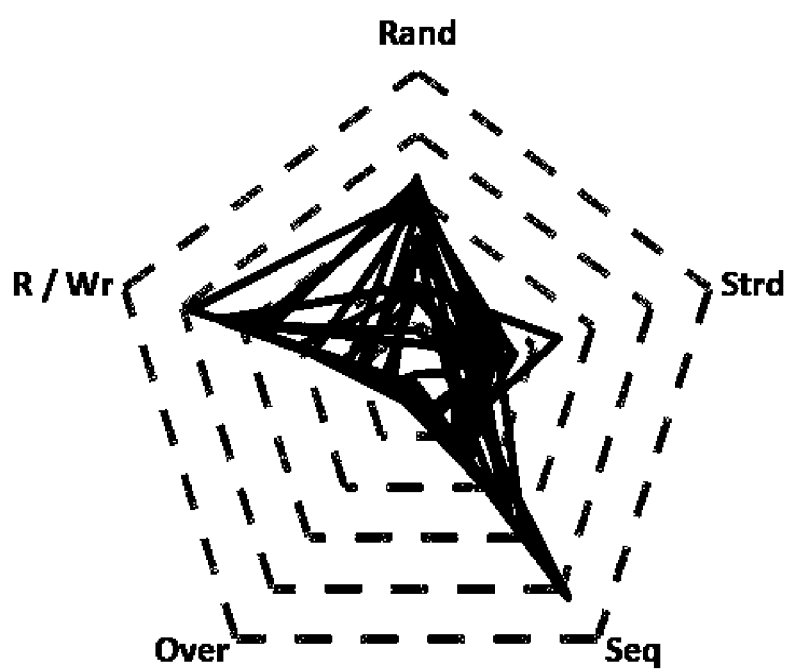
FIG. 5E shows characterization of workloads categorized as large file generators, consistent with one or more exemplary embodiments of the present disclosure.

FIG. 5E shows the characterization of workloads categorized as large file generators, consistent with one or more exemplary embodiments of the present disclosure. Surveillance systems that store videos and monitoring systems may have a few processes that write large files to the disk. Almost all requests in the workloads in this category may be writes and each process may issue sequential requests. Interleaving of the requests from various processes may be the root cause of many sequential requests to appear as random in this category. The cache configuration for this category may have a large cache line size. Upon evicting a data page from the cache memory, the cache may be searched and all data pages with the addresses near the evicted data page may be evicted as well. Since sequential requests may have higher performance in HDDs, evicting data pages with address near each other will may the performance cost of cache flushing and may ensure that the sequential requests from a process are committed at the same time to the HDD together and the disk observes less number of random requests.

Figure 6:
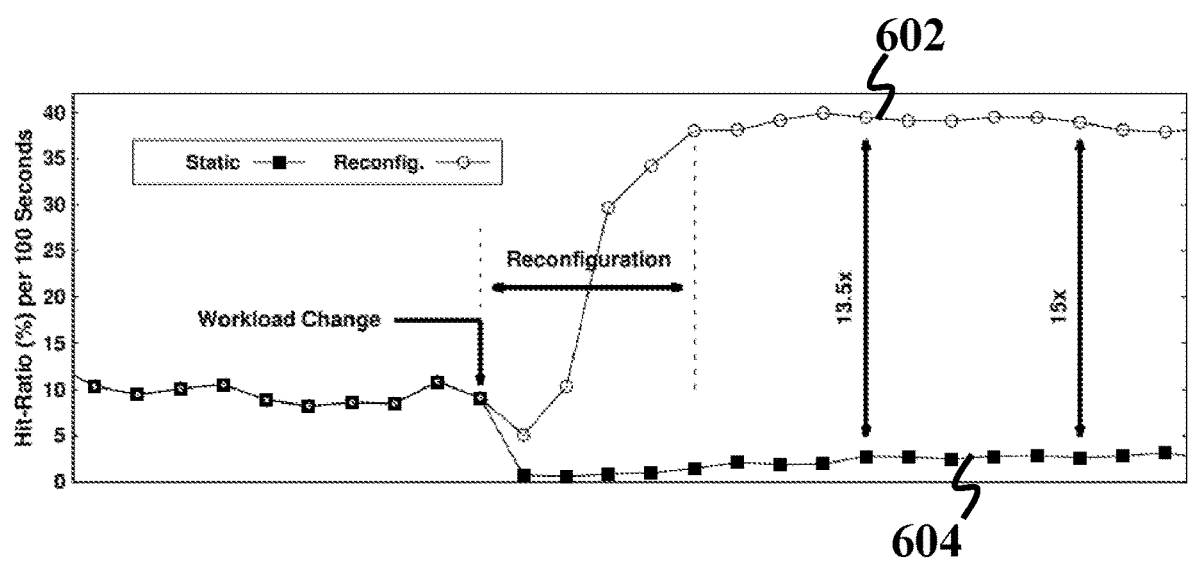
FIG. 6 shows hit ratio of an exemplary caching with and without reconfiguration, consistent with one or more exemplary embodiments of the present disclosure.

To evaluate the efficiency of an exemplary implementation of method 100 and its performance overhead, a hit ratio (i.e., ratio of cached requests to total requests) of caching with and without reconfiguration upon changing the workload type is examined. In both scenarios, a workload fileserver from a sequential producer-consumer class is running and cache configuration is optimized toward its requests. The workload type is changed into exchange server from random producer-consumer class and its impact on the hit ratio is observed. FIG. 6 shows the hit ratio of an exemplary implementation of method 100 with reconfiguration 602 and without reconfiguration 604 (i.e., static), consistent with one or more exemplary embodiments of the present disclosure. The performance overhead of the reconfiguration process is very small and the cache reaches its optimal state in less than five minutes of changing the workload type. Although the static technique shows a good performance for the first workload, due to the change in the workload type, it becomes inefficient in the new workload.

While the foregoing has described what may be considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various implementations. This is for purposes of streamlining the disclosure, and is not to be interpreted as reflecting an intention that the claimed implementations require more features than are expressly recited in each claim. Rather, as the following claims reflect, inventive subject matter lies in less than all features of a single disclosed implementation. Thus, the following claims are hereby incorporated into the Detailed Description, with each claim standing on its own as a separately claimed subject matter.

While various implementations have been described, the description is intended to be exemplary, rather than limiting and it will be apparent to those of ordinary skill in the art that many more implementations and implementations are possible that are within the scope of the implementations. Although many possible combinations of features are shown in the accompanying figures and discussed in this detailed description, many other combinations of the disclosed features are possible. Any feature of any implementation may be used in combination with or substituted for any other feature or element in any other implementation unless specifically restricted. Therefore, it will be understood that any of the features shown and/or discussed in the present disclosure may be implemented together in any suitable combination. Accordingly, the implementations are not to be restricted except in light of the attached claims and their equivalents. Also, various modifications and changes may be made within the scope of the attached claims.

What is claimed is:

1. A method for reconfigurable caching, the method comprising:
   receiving a workload comprising a plurality of requests;
   classifying a first request of the plurality of requests in a first class;
   classifying the workload in a second class based on the first class;
   assigning a priority to the first request based on the first class and the second class; and
   storing the first request in a cache memory comprising a plurality of blocks responsive to:
      the first request satisfying a caching condition;
      the cache memory satisfying a validation condition; and
      the priority satisfying a priority condition, the priority condition comprises one of:
         at least one of the plurality of blocks being empty; and
         the priority of the first request being larger than a smallest block priority of a plurality of block priorities, each of the plurality of block priorities assigned to a block of the plurality of blocks.

2. The method of claim 1, wherein classifying the first request comprises:
   classifying the first request in a random class;
   arranging the plurality of requests in a request queue;
   selecting the first request from the request queue, the first request associated with a first plurality of addresses, each of the first plurality of addresses being an integer number;
   selecting a second request of the plurality of requests from the request queue, the second request associated with a second plurality of addresses, each of the second plurality of addresses being an integer number;
   classifying the first request in a strided class responsive to a smallest address of the first plurality of addresses being larger than a largest address of the second plurality of addresses by a gap value, the gap value being smaller than a gap threshold;
   classifying the first request in a sequential class responsive to the smallest address of the first plurality of addresses being larger than the largest address of the second plurality of addresses by 1; and classifying the first request in an overlapped class responsive to a first portion of the first plurality of addresses being the same as a second portion of the second plurality of addresses.

3. The method of claim 2, wherein arranging the plurality of requests in the request queue comprises arranging the plurality of requests in a queue with a size of 65 requests.

4. The method of claim 2, wherein classifying the workload in the second class comprises:

classifying the workload in a random consumer class responsive to more than 60 percent of the plurality of requests read from a memory unit and more than 70 percent of the plurality of requests classified in the random class;

classifying the workload in a sequential producer-consumer class responsive to 40 percent to 60 percent of the plurality of requests read from the memory unit and more than 50 percent of the plurality of requests classified in the sequential class;

classifying the workload in a random producer-consumer class responsive to 40 percent to 80 percent of the plurality of requests read from the memory unit and more than 60 percent of the plurality of requests classified in the random class;

classifying the workload in an archival consumer class responsive to more than 80 percent of the plurality of requests read from the memory unit and more than 70 percent of the plurality of requests classified in the sequential class; and classifying the workload in a large file generator class responsive to more than 90 percent of the plurality of requests written on the memory unit and more than 60 percent of the plurality of requests classified in the sequential class.

5. The method of claim 4, wherein assigning the priority to the first request comprises assigning a number to the first request, the number associated with a unique combination of:

one of the random class, the strided class, the sequential class, and the overlapped class;

one of the random consumer class, the sequential producer-consumer, the random producer-consumer class, the archival consumer class, and the large file generator class; and a request type associated with the first request, the request type comprising a read request and a write request.

6. The method of claim 2, wherein classifying the workload in the second class comprises:

classifying the workload in a random consumer class responsive to:
more than 60 percent of the plurality of requests read from a memory unit,
more than 70 percent of the plurality of requests classified in the random class,
less than 15 percent of the plurality of requests classified in the strided class,
more than 10 percent of the plurality of requests classified in the sequential class, and
more than 10 percent of the plurality of requests classified in the overlapped class;

classifying the workload in a sequential producer-consumer class responsive to:
40 percent to 60 percent of the plurality of requests read from the memory unit,
less than 30 percent of the plurality of requests classified in the random class,
less than 20 percent of the plurality of requests classified in the strided class,
more than 50 percent of the plurality of requests classified in the sequential class, and
less than 50 percent of the plurality of requests classified in the overlapped class;

classifying the workload in a random producer-consumer class responsive to:
40 percent to 80 percent of the plurality of requests read from the memory unit,
more than 60 percent of the plurality of requests classified in the random class,
less than 30 percent of the plurality of requests classified in the strided class,
less than 30 percent of the plurality of requests classified in the sequential class, and
less than 10 percent of the plurality of requests classified in the overlapped class;

classifying the workload in an archival consumer class responsive to:
more than 80 percent of the plurality of requests read from the memory unit,
less than 20 percent of the plurality of requests classified in the random class,
less than 40 percent of the plurality of requests classified in the strided class,
more than 70 percent of the plurality of requests classified in the sequential class, and
20 percent to 90 percent of the plurality of requests classified in the overlapped class; and classifying the workload in a large file generator class responsive to:
more than 90 percent of the plurality of requests written on the memory unit,
more than 40 percent of the plurality of requests classified in the random class,
less than 20 percent of the plurality of requests classified in the strided class,
more than 60 percent of the plurality of requests classified in the sequential class, and
less than 10 percent of the plurality of requests classified in the overlapped class.

7. The method of claim 1, wherein the caching condition comprises the first request not stored in the cache memory.

8. The method of claim 1, wherein the validation condition comprises all of the plurality of blocks being valid.

9. The method of claim 1, further comprising:
sending the first request to a hard disk drive responsive to the first request tagged uncacheable; and
invalidating a block of the plurality of blocks responsive to the first request tagged uncacheable and the first request stored in the block.

10. The method of claim 1, wherein storing the first request in the cache memory comprises:

storing the first request in an empty block responsive to at least one of the plurality of blocks being empty; and
storing the first request in a minimal-priority block responsive to the priority of the first request being larger than the smallest block priority, the minimal-priority block associated with the smallest block priority.

11. The method of claim 10, further comprising storing data of the minimal-priority block in a memory unit prior to storing the first request in the minimal-priority block.

12. A system for reconfigurable caching, the system comprising:
a memory having processor-readable instructions stored therein; and
a processor configured to access the memory and execute the processor-readable instructions, which, when executed by the processor configures the processor to perform a method, the method comprising:
receiving a workload comprising a plurality of requests from a filesystem;
classifying a first request of a plurality of requests in a random class;
arranging the plurality of requests in a request queue;
selecting the first request from the request queue, the first request associated with a first plurality of addresses, each of the first plurality of addresses being an integer number;
selecting a second request of the plurality of requests from the request queue, the second request associated with a second plurality of addresses, each of the second plurality of addresses being an integer number;
classifying the first request in a strided class responsive to a smallest address of the first plurality of addresses being larger than a largest address of the second plurality of addresses by a gap value, the gap value being smaller than a gap threshold;
classifying the first request in a sequential class responsive to the smallest address of the first plurality of addresses being larger than the largest address of the second plurality of addresses by 1;
classifying the first request in an overlapped class responsive to a first portion of the first plurality of addresses being the same as a second portion of the second plurality of addresses
classifying the workload in a random consumer class responsive to more than 60 percent of the plurality of requests read from a memory unit and more than 70 percent of the plurality of requests classified in the random class;
classifying the workload in a sequential producer-consumer class responsive to 40 percent to 60 percent of the plurality of requests read from the memory unit and more than 50 percent of the plurality of requests classified in the sequential class;
classifying the workload in a random producer-consumer class responsive to 40 percent to 80 percent of the plurality of requests read from the memory unit and more than 60 percent of the plurality of requests classified in the random class;
classifying the workload in an archival consumer class responsive to more than 80 percent of the plurality of requests read from the memory unit and more than 70 percent of the plurality of requests classified in the sequential class;
classifying the workload in a large file generator class responsive to more than 90 percent of the plurality of requests written on the memory unit and more than 60 percent of the plurality of requests classified in the sequential class;
assigning a priority to the first request based on the classified first request and the classified workload; and
storing the first request in a cache memory comprising a plurality of blocks responsive to:
the first request not stored in the cache memory;
all of the plurality of blocks being valid; and
the priority of the first request being larger than a smallest block priority of a plurality of block priorities, each of the plurality of block priorities assigned to a block of the plurality of blocks.

13. A reconfigurable caching architecture, comprising:
a file system;
a cache memory comprising a plurality of blocks;
a mapping unit configured to:
receive a workload comprising a plurality of requests from the file system, the plurality of requests comprising a first request;
send the first request to a hard disk drive responsive to the first request tagged uncacheable; and
invalidate a block of the plurality of blocks responsive to the first request tagged uncacheable and the first request stored in the block;
an analyzing unit coupled to the mapping unit, the analyzing unit configured to classify the first request in a first class;
a reconfiguration unit coupled to the analyzing unit, the reconfiguration unit configured to classify the workload in a second class based on the first class;
a priority calculation unit coupled to the reconfiguration unit, the priority calculation unit configured to assign a priority to the first request based on the first class and the second class;
and
a cache managing unit configured to store the first request in the cache memory responsive to:
the first request not stored in the cache memory;
all of the plurality of blocks being valid; and
the priority satisfying a priority condition.

14. The reconfigurable caching architecture of claim 13, further comprising a queue managing unit configured to arrange the plurality of requests in a request queue, the request queue comprising:
the first request associated with a first plurality of addresses, each of the first plurality of addresses being an integer number; and
a second request of the plurality of requests associated with a second plurality of addresses, each of the second plurality of addresses being an integer number.

15. The reconfigurable caching architecture of claim 14, wherein the first class comprises:
a random class;
a strided class responsive to a smallest address of the first plurality of addresses being larger than a largest address of the second plurality of addresses by a gap value, the gap value smaller than a gap threshold;
a sequential class responsive to the smallest address of the first plurality of addresses being larger than the largest address of the second plurality of addresses by 1; and
an overlapped class responsive to a first portion of the first plurality of addresses being the same as a second portion of the second plurality of addresses.

16. The reconfigurable caching architecture of claim 15, wherein the second class comprises:
a random consumer class responsive to more than 60 percent of the plurality of requests read from a hard disk drive and more than 70 percent of the plurality of requests classified in the random class;
a sequential producer-consumer class responsive to 40 percent to 60 percent of the plurality of requests read from the hard disk drive and more than 50 percent of the plurality of requests classified in the sequential class;

a random producer-consumer class responsive to 40 percent to 80 percent of the plurality of requests read from the hard disk drive and more than 60 percent of the plurality of requests classified in the random class;

an archival consumer class responsive to more than 80 percent of the plurality of requests read from the hard disk drive and more than 70 percent of the plurality of requests classified in the sequential class; and a large file generator class responsive to more than 90 percent of the plurality of requests written on the hard disk drive and more than 60 percent of the plurality of requests classified in the sequential class.

17. The reconfigurable caching architecture of claim 13, wherein the priority condition comprises one of:

at least one of the plurality of blocks being empty; and the priority of the first request being larger than a smallest block priority of a plurality of block priorities, each of the plurality of block priorities assigned to a block of the plurality of blocks.

18. The reconfigurable caching architecture of claim 17, wherein the cache managing unit is further configured to store data of a minimal-priority block in a hard disk drive prior to storing the first request in the cache memory, the minimal-priority block associated with the smallest block priority.

19. The reconfigurable caching architecture of claim 13, wherein the cache memory comprises a solid-state drive.

20. The reconfigurable caching architecture of claim 15, wherein the priority calculation unit is further configured to assign a priority to the first request by assigning a number to the first request, the number associated with a unique combination of:

one of the random class, the strided class, the sequential class, and the overlapped class;

one of the random consumer class, the sequential producer-consumer, the random producer-consumer class, the archival consumer class, and the large file generator class; and a request type associated with the first request, the request type comprising a read request and a write request.

* * * * *